United States Patent [19]

Cherukuri et al.

[11] Patent Number: 4,961,935
[45] Date of Patent: Oct. 9, 1990

[54] SUGARLESS, SUBSTANTIALLY ANHYDROUS CHEWING GUM COMPOSITIONS AND METHODS FOR PREPARING SAME

[75] Inventors: Subraman R. Cherukuri, Towaco, N.J.; Daniel A. Orlandi, Flushing, N.Y.; Steven M. Faust, Stanhope; J. Francisco Zamudio-Tena, Morristown, both of N.J.

[73] Assignee: Warner-lambert Company, Del.

[21] Appl. No.: 336,678

[22] Filed: Apr. 12, 1989

Related U.S. Application Data

[63] Continuation-in-part of Ser. No. 137,396, Dec. 23, 1987, abandoned.

[51] Int. Cl.$^5$ .............................................. A23G 3/30
[52] U.S. Cl. ...................................... 426/3; 426/548; 426/658
[58] Field of Search ................ 426/3, 4, 5, 6, 548, 426/658

[56] References Cited

U.S. PATENT DOCUMENTS

| | | | |
|---|---|---|---|
| 3,262,784 | 12/1963 | Bucher | 99/135 |
| 4,035,572 | 7/1977 | Stubits et al. | 536/108 |
| 4,117,173 | 9/1978 | Schiweck | 426/548 |
| 4,150,161 | 4/1979 | Rudolph et al. | 426/3 |
| 4,217,413 | 8/1980 | Walon | 426/658 |
| 4,317,838 | 3/1982 | Cherukuri et al. | 426/5 |
| 4,382,963 | 5/1983 | Klose et al. | 426/3 |
| 4,514,422 | 12/1981 | Yang et al. | 426/3 |
| 4,579,738 | 5/1985 | Cherukuri et al. | 426/3 |
| 4,587,119 | 5/1986 | Bucke et al. | 426/3 |
| 4,683,138 | 9/1986 | Glass et al. | |
| 4,792,453 | 12/1988 | Reed et al. | 426/5 |

FOREIGN PATENT DOCUMENTS

88/08671 11/1988 World Int. Prop. O. ............. 426/5

OTHER PUBLICATIONS

Grenby, T., Development in Sweeteners-2, Applied Science Pub., London & N.Y. 1983, pp. 79-80.

Primary Examiner—Jeanette Hunter
Attorney, Agent, or Firm—Daniel A. Scola, Jr.

[57] ABSTRACT

The present invention pertains to a sugarless, substantially anhydrous chewing gum composition which comprises a gum base, a non-hygroscopic bulking agent comprising a racemic mixture of alpha-D-glucopyranosyl-1,6-mannitol and alpha-D-glucopyranosyl-1,6-sorbitol, a softening agent, and a sweetening agent. The gum composition preferably contains no more than about 2.5% water, by weight of the total chewing gum composition. The sugarless, substantially anhydrous chewing gum compositions may be used in a variety of chewing gum products. The present invention also pertains to methods for preparing the sugarless, substantially anhydrous chewing gum compositions and the chewing gum products in which they may be used.

43 Claims, 2 Drawing Sheets

[4,961,935]

SUGARLESS, SUBSTANTIALLY ANHYDROUS CHEWING GUM COMPOSITIONS AND METHODS FOR PREPARING SAME

BACKGROUND OF THE INVENTION

This application is a continuation-in-part of copending application Ser. No. 137,396, filed Dec. 23, 1987 now abandoned.

FIELD OF THE INVENTION

This invention relates to improved chewing gum compositions, and more particularly, to sugarless, substantially anhydrous chewing gum compositions which provide chewing gum products having firmer texture and reduced moisture absorption properties. The improved chewing gum compositions may be utilized in a variety of chewing gum products such as confectionery coated chewing gum products. This invention also relates to methods for preparing these sugarless, substantially anhydrous chewing gum compositions and the chewing gum products in which they may be used.

DESCRIPTION OF THE PRIOR ART

Chewing gum compositions typically contain a water-insoluble chewable gum base, a bulking agent, and other additives such as a sweetening agent and a flavoring agent. Usually the gum base also contains plasticizers or softeners to improve the consistency and texture of the gum. The bulking agent generally comprises water-soluble sweeteners such as sucrose or corn syrup or in sugarless gums, sorbitol, mannitol together with an artificial sweetener.

A commonly noted problem with chewing gums is the tendency for certain gums to lose moisture during storage which results in the chewing gum product becoming inelastic resulting in a brittle and crumbly or "stale" product. Other chewing gums tend to absorb moisture during storage which results in the gum product losing its firmness.

This firmness problem is frequently observed in sugarless gums which typically contain large amounts of hygroscopic sugar alcohols. Because of the hygroscopic humectant softeners and the high moisture content usually found in sugarless gums, these gums are generally not very firm. On storage, these gums tend to absorb additional moisture which further reduces the firmness of the gum. In addition to providing an unsatisfactory mouth feel, this lack of firmness makes coating sugarless gums with a confectionery coating particularly difficult and usually results in the formation of gum products which are less crispy.

U.S. Pat. No. 4,514,422, issued to Yang et al. and assigned to Warner-Lambert Company, discloses a gum composition having improved resistance to becoming stale comprising a substantially anhydrous mixture of a gum base, at least one sugar alcohol, and glycerin, wherein the gum composition contains no greater than 2% by weight of water. Gum products made according to this invention absorb significant amounts of moisture, up to about 35%.

U.S. Pat. No. 4,382,963, issued to Klose et al. and assigned to General Foods Corporation, discloses a sugarless, low-calorie gum composition comprising a gum base, spray-dried polydextrose having a moisture content of less than 5%, and glycerin, wherein the gum composition has from 1% to 5% by weight of water.

U.S. Pat. No. 4,579,738, issued to Cherukuri et al. and assigned to Warner-Lambert Company, discloses a sugar-containing gum composition having improved resistance to becoming stale comprising a soft gum base, a solid water-soluble natural sweetening agent and a flavoring agent absorbed into the microchannels of an edible food material. No humectants or other moisture containing ingredients are used and the gum composition has a moisture content of up to about 0.9%, by weight of the final composition.

Other methods for promoting chewing gum firmness have focused on the preparation of substantially anhydrous gum compositions such as those disclosed in Bucher U.S. Pat. No. 3,262,784, Stubits et al., U.S. Pat. No. 4,035,572, al., Rudolph et al., U.S. Pat. No. 4,150,161, and Glass et al U.S. Pat. No. 4,638,138.

While the above sugarless chewing gum compositions provide some degree of improved firmness and improved resistance to moisture loss, none of the above compositions has overcome the problem of increasing the firmness, while reducing the moisture absorption properties, of a sugarless chewing gum. The addition of humectants or other hygroscopic material to sugarless gums to prevent moisture loss also tends to increase moisture absorption. The preparation of an initially anhydrous gum composition does not solve the moisture absorption problem later encountered during storage.

Thus it would be commercially advantageous to provide a sugarless chewing gum composition which has a firm structure and reduced moisture absorption properties. Such a composition would be easier to process and package as well as to coat with a confectionery material. The present invention provides such improved sugarless chewing gum compositions without the disadvantages characteristic of previously known products. The present invention also provides methods by which these improved sugarless, substantially anhydrous chewing gum compositions may be prepared.

SUMMARY OF THE INVENTION

The present invention pertains to a sugarless, substantially anhydrous chewing gum composition which comprises a gum base, a non-hygroscopic bulking agent comprising a racemic mixture of alpha-D-glucopyranosyl-1,6-mannitol and alpha-D-glucopyranosyl-1,6-sorbitol, a softening agent, and a sweetening agent. The gum composition preferably contains no more than about 2.5% water, by weight of the total chewing gum composition. The sugarless, substantially anhydrous chewing gum compositions may be used in a variety of chewing gum products. The present invention also pertains to methods for preparing the sugarless, substantially anhydrous chewing gum compositions and the chewing gum products in which they may be used.

DETAILED DESCRIPTION OF THE INVENTION

Figure 1:
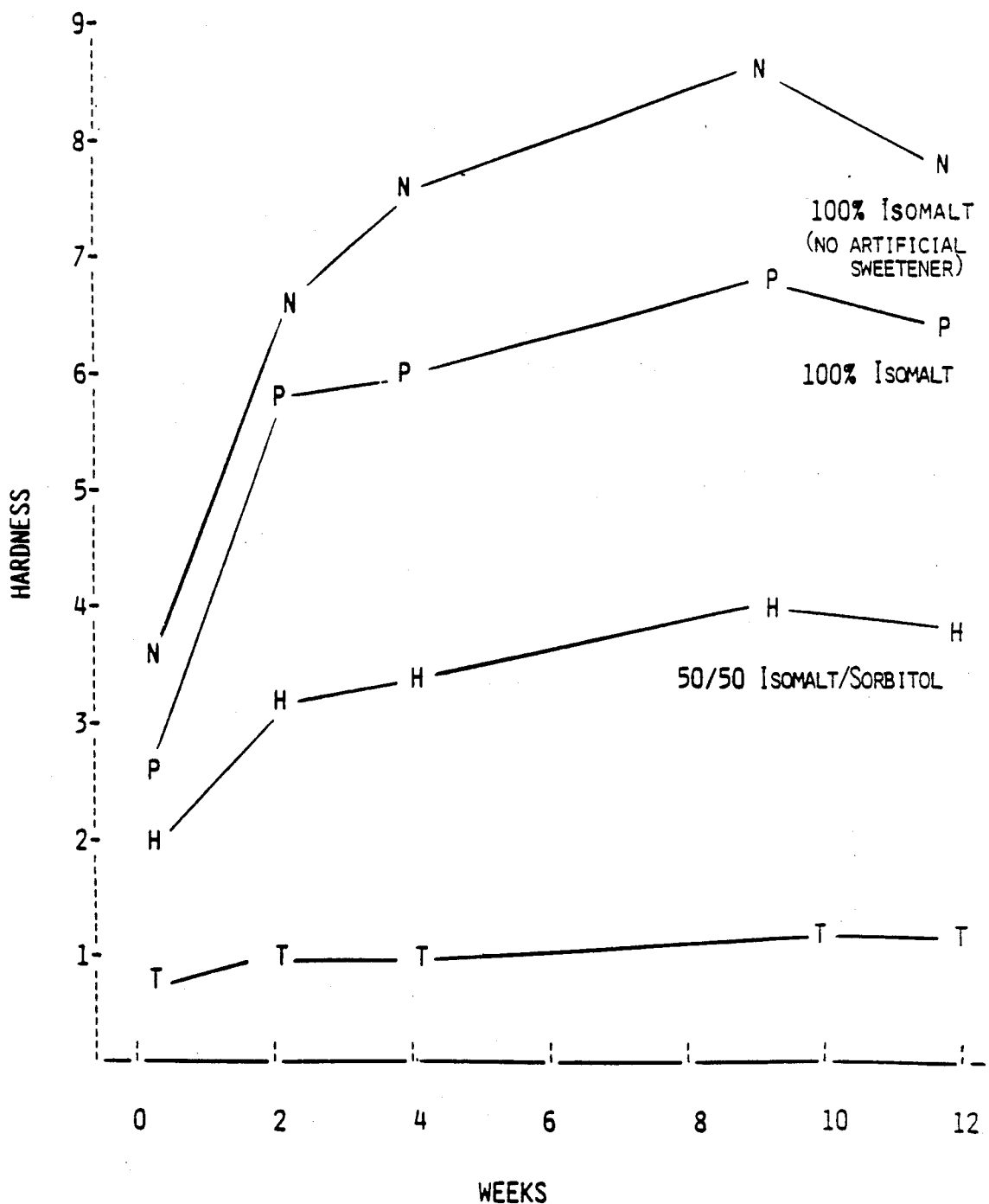
FIG. 1 depicts in graph format the relative degree of hardness versus storage time at 23° C. and 23% relative humidity of several chewing gum compositions containing various combinations of sugar alcohols and PALATINIT as the bulking agent (Examples 1—4).

The present invention pertains to sugarless, substantially anhydrous chewing gum compositions which provide chewing gum products having firm texture and reduced moisture pick-up. In particular, the present invention relates to an improved chewing gum composition which comprises (a) a gum base, (b) a non-hygroscopic bulking agent comprising a racemic mixture of alpha-D-glucopyranosyl-1,6-mannitol and alpha-D-gluco-pyranosyl-1,6-sorbitol, (c) a softening agent, and (d) a sweetening agent. The present invention also pertains to methods for preparing the sugarless, substantially anhydrous chewing gum compositions and the chewing gum products in which they may be used.

Racemic mixtures of alpha-D-glucopyranosyl-1,6-mannitol and alpha-D-gluco-pyranosyl-I,6-sorbitol may contain up to about 7% moisture. In addition to the moisture present in the bulking agent, the substantially anhydrous chewing gum compositions should preferably contain no more than about 2.5% water, more preferably no more than about 1.5% water, and most preferably no more than about 1% water, by weight of the total chewing gum composition.

Applicants have found that when bulking agents such as sugar alcohols are replaced with a racemic mixture of alpha-D-glucopyranosyl-1,6-mannitol and alpha-D-glucopyranosyl-1,6-sorbitol in a sugarless chewing gum composition, an anhydrous chewing gum product having firmer texture and reduced moisture absorption properties is obtained. Because the chewing gum compositions of the present invention do not significantly absorb water during storage, the gum compositions retain their firmness. Furthermore, the firmness and low moisture absorption properties are maintained even when a hygroscopic softening agent is added to balance the firmness and improve the texture and consistency of the chewing gum. The firmness of the novel chewing gum compositions facilitates the processing and packaging of the gums and also simplifies the coating of such gums with confectionery coatings during the preparation of pelletized gums.

The non-hygroscopic bulking agent in the present invention should be present in the chewing gum composition in an amount sufficient to provide a firm texture in the chewing gum product and to contribute substantial non-hygroscopic properties (low moisture absorption) to the composition. The softening agent in the present invention should be present in the chewing gum composition in an amount sufficient to provide a balance of firmness and acceptable chewing qualities in the chewing gum product. Because softening agents are generally hygroscopic, the non-hygroscopic bulking agent must be present in the chewing gum composition in an amount sufficient to counterbalance the tendency of the softening agent to absorb water.

In a preferred embodiment, the sugarless, substantially anhydrous chewing gum compositions of the present invention comprise, in percentages by weight of the total composition: (1) a gum base present in an amount from about 10% to about 75%, (2) a non-hygroscopic bulking agent comprising a racemic mixture of alpha-D-glucopyranosyl-1,6-mannitol and alpha-D-glucopyranosyl-1,6-sorbitol present in an amount from about 10% to about 70%, (3) a softening agent present in an amount up to about 18%, and (4) a sweetening agent present in an amount from about 0.001% to about 3%. In a more preferred embodiment, the sugarless chewing gum compositions of the present invention comprise, in percentages by weight of the total composition: (1) a gum base present in an amount from about 15% to about 40%, (2) a non-hygroscopic bulking agent present in an amount from about 25% to about 65%, (3) a softening agent in an amount from about 5% to about 18%, and (4) a sweetening agent present in an amount from about 0.01% to about 1%. In a most preferred embodiment, the sugarless chewing gum compositions of the present invention comprise, in percentages by weight of the total composition: (1) a gum base present in an amount from about 23% to about 35%, (2) a non-hygroscopic bulking agent present in an amount from about 30% to about 60%, (3) a softening agent present in an amount from about 10% to about 14%, and (4) a sweetening agent present in an amount from about 0.02% to about 0.5%.

The improved chewing gum compositions of the present invention comprise a gum base, a non-hygrosoopic bulking agent, a softening agent, a sweetening agent, and various additives such as flavoring agents and coloring agents. The present invention also includes a method for preparing the improved chewing gum compositions, including both chewing gum and bubble gum formulations. The sugarless, substantially anhydrous chewing gum compositions may be used in a variety of chewing gum products, such as sticks, slabs, chunks, balls, ropes, tablets, and center filled and confectionery coated gum products.

The gum base employed in the present invention will vary greatly depending upon various factors such as the type of base desired, the consistency of gum desired and the other components used in the composition to make the final chewing gum product. The gum base may be any water-insoluble gum base known in the art, and includes those gum bases utilized for chewing gums and bubble gums. Illustrative examples of suitable polymers in gum bases include both natural and synthetic elastomers and rubbers. For example, those polymers which are suitable as gum bases include, without limitation, substances of vegetable origin such as chicle, natural rubber, crown gum, nispero, rosidinha, jelutong, perillo, niger gutta, tunu, balata, guttapercha, lechi capsi, sorva, gutta kay, mixtures thereof and the like. Synthetic elastomers such as butadiene-styrene copolymers, polyisobutylene, isobutylene-isoprene copolymers, polyethylene, mixtures thereof, and the like, are particularly useful.

Suitable gum bases also include a non-toxic vinyl polymer, such as polyvinyl acetate and its partial hydrolysate, polyvinyl alcohol, and mixtures thereof. When utilized, the molecular weight of the vinyl polymer may range from about 2,000 up to, and including, about 94,000.

The amount of gum base employed will vary greatly depending upon various factors such as the type of base used, the consistency of the gum desired and the other components used in the composition to make the final chewing gum product. In general, the gum base will be present in amounts from about 10% to about 75%, preferably in amounts from about 15% to about 40%, and more preferably in amounts from about 23% to about 35%, by weight of the final chewing gum composition.

The gum base composition may contain conventional elastomer solvents to aid in softening the elastomer base component. Such elastomer solvents may comprise terpinene resins such as polymers of alphapinene or beta-pinene, methyl, glycerol or pentaerythritol esters of rosins or modified rosins and gums, such as hydrogenated, dimerized or polymerized rosins or mixtures thereof. Examples of elastomer solvents suitable for use herein include the pentaerythritol ester of partially hydrogenated wood or gum rosin, the pentaerythritol ester of wood or gum rosin, the glycerol ester of wood rosin, the glycerol ester of partially dimerized wood or gum rosin, the glycerol ester of polymerized wood or gum rosin, the glycerol ester of tall oil rosin, the glycerol ester of wood or gum rosin and the partially hydrogenated wood or gum rosin and the partially hydrogenated methyl ester of wood or rosin, mixtures thereof, and the like. The elastomer solvent may be employed in amounts from about 5% to about 75%, and preferably from about 45% to about 70%, by weight of the gum base.

The gum base may also include plasticizers or softeners such as lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, mixtures thereof, and the like. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. Such materials are incorporated into the gum base to provide a variety of desirable textures and consistency properties. Because of the low molecular weight of these ingredients, they are able to penetrate the fundamental structure of the gum base making it plastic and less viscous. These additional materials are generally employed in amounts up to about 18%, preferably in amounts from about 5% to about 18%, and more preferably in amounts from about 10% to about 14%, by weight of the gum base.

In a preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base may also include effective amounts of mineral adjuvants such as calcium carbonate, magnesium carbonate, alumina, aluminum hydroxide, aluminum silicate, talc, tricalcium phosphate, dicalcium phosphate and the like, as well as mixtures thereof. These mineral adjuvants may serve as fillers and textural agents. These fillers or adjuvants may be used in the gum base in various amounts. Preferably the amount of filler, when used, will be present in an amount up to about 60%, by weight of the chewing gum base.

A variety of traditional ingredients may be included in the gum base in effective amounts such as coloring agents, antioxidants, preservatives, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the chewing gum base.

The gum composition may include effective amounts of conventional additives selected from the group consisting of sweetening agents (sweeteners), plasticizers, softeners, emulsifiers, waxes, fillers, bulking agents (carriers, extenders), mineral adjuvants, flavoring agents (flavors, flavorings), coloring agents (colorants, colorings), antioxidants, acidulants, thickeners, mixtures thereof, and the like. Some of these additives may serve more than one purpose. For example, in sugarless gum compositions, a sweetener, such as sorbitol or other sugar alcohol or mixtures thereof, may also function as a bulking agent.

The plasticizers, softening agents, mineral adjuvants, coloring agents, waxes and antioxidants discussed above, as being suitable for use in the gum base, may also be used in the gum composition. Examples other conventional additives which may be used include emulsifiers, such as lecithin and glyceryl monostearate, thickeners, used alone or in combination with other softeners, such as methyl cellulose, alginates, carrageenan, xanthan gum, gelatin, carob, tragacanth, locust bean, and carboxy methyl cellulose, acidulants such as malic acid, adipic acid, citric acid, tartaric acid, fumaric acid, and mixtures thereof, and fillers, such as those discussed above under the category of mineral adjuvants. The fillers, when used, may be utilized in an amount up to about 60%, by weight of the gum composition.

The bulking agent of the present invention is a sugarless, substantially anhydrous, non-hygroscopic bulking agent. More particularly, the bulking agent comprises a racemic mixture of alpha-D-glucopyranosyl-1,6-mannitol and alpha-D-glucopyranosyl-1,6-sorbitol, which has the following chemical structure:

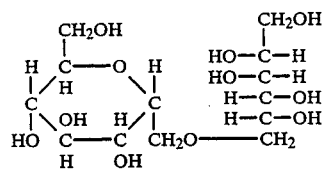

alpha-D-glucopyranosyl-1,6-mannitol

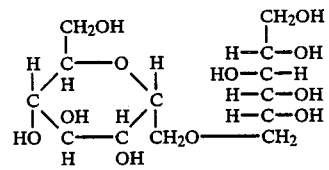

alpha-D-glucopyranosyl-1,6-sorbitol

In a preferred embodiment, the sugarless bulking agent which comprises a racemic mixture of alpha-D-glucopyranosyl-1,6-mannitol and alpha-D-glucopyranosyl-1,6-sorbitol is the commercially available nonhygroscopic bulking agent manufactured under the tradename PALATINIT, by Suddeutsche Zucker. PALATINIT has a relative sweetness to sucrose of about 0.50–0.60x, contains 2 calories per gram, and has a solubility of 28.7g/100ml water at 25+ C. The non-hygroscopic bulking agent is present in the composition in amounts from about 10% to about 70%, preferably from about 25% to about 65%, and more preferably from about 30% to about 60%, by weight of the chewing gum composition.

In another embodiment of the present invention, the non-hygroscopic bulking agent comprises a mixture of (a) a racemic mixture of alpha-D-glucopyranosyl-1,6-mannitol and alpha-D-glucopyranosyl-1,6-sorbitol and (b) a sugar alcohol. The presence of the racemic mixture of alpha-D-glucopyranosyl-1,6-mannitol and alpha-D-glucopyranosyl-1,6-sorbitol in the improved gum composition helps to provide firmness and reduced moisture absorption in the chewing gum product. The presence of a sugar alcohol in the improved gum composition helps to maintain a balance of firmness and to provide additional sweetness in the chewing gum product.

Preferred sugar alcohols in the present invention are selected from the group consisting of sorbitol, xylitol, maltitol, mannitol, galactitol, and mixtures thereof. More preferred sugar alcohols are sorbitol or a mixture of sorbitol and mannitol. The most preferred sugar alcohol is sorbitol with the gamma form of sorbitol being preferred.

Because sugar alcohols are generally hygroscopic, the racemic mixture of alpha-D-glucopyranosyl-1,6-mannitol and alpha-D-glucopyranosyl-1,6-sorbitol must be present in the bulking agent in an amount sufficient to counterbalance the tendency of the sugar alcohols to absorb water. When sugar alcohols are employed with the racemic mixture of alpha-D-glucopyranosyl-1,6-mannitol and alpha-D-glucopyranosyl-1,6-sorbitol as the bulking agent, the sugar alcohols are present in an amount up to about 67%, preferably up to about 50%, and more preferably up to about 25%, by weight of the total bulking agent.

The sweetening agents (sweeteners) used may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such as dihydrochalcones, monellin, steviosides, glycyrrhizin, dihydroflavenol, and sugar alcohols such as sorbitol, mannitol, maltitol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazone-4-one-2,2-dioxide (AcesulfameK), the free acid form of saccharin, and the like;

(c) dipeptide based sweeteners, such as L-aspartic acid derived sweetners, such as L-aspartyl-L-phenylalanine methyl ester (Aspartame) and materials described in U.S. Pat. No. 3,492,131, L-alphaaspartyl-N-(2,2,4,4-tetramethyl-b 3-thietanyl)-D-alaninamide hydrate (Alitame), methyl esters of L-aspartyl-L-phenylglycerine and L-aspartyl-L-2,5-dihydrophenylglycine, L-aspartyl-2,5-dihydro-L-phenylalanine; L-aspartyl-L-(1-cyclohexen)-alanine, and the like;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxsucrose and chlorodeoxygalactosucrose derivatives include but are not limited to: 1-chloro-1,'-deoxysucrose; 4-chloro-4-deoxy-alpha-D-galactopyranosyl-alpha-D-fructofuranoside, or 4-chloro-4-pyranosyl-1-chloro-1-deoxy-beta-D-fructo-furanoside, or 4,1'-dichloro-4,1'-dideoxygalactosucrose; 1',6'-dichloro-1,'6'-dideoxysucrose; 4-chloro-4-deoxy-alpha-D-galactopyranosyl-1,6-dichloro-1,6-dideoxy-beta-D-fructofuranoside or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-di-deoxy-beta-D-fructofuranoside, or 4,6,1',6'-tetrachloro-4,6,1',6'-tetradeoxygalacto-sucrose; and 4,6,1',6'-tetrachloro-4,6,1',6'-tetradeoxy-sucrose; and (e) protein based sweeteners such as thaumaoccous danielli (Thaumatin I and II).

The intense sweetening agents of the present invention may be used in many distinct physical forms well known in the art to provide an initial burst of sweetness and/or a prolonged sensation of sweetness. Without being limited thereto, such physical forms include free forms, such as spray dried, powdered, and beaded forms, and encapsulated forms, and mixtures thereof.

In general, an effective amount of sweetener is utilized to provide the level of sweetness desired, and this amount will vary with the sweetener selected. The amount of sweetener will normally be present in amounts from about 0.001% to about 3%, by weight of the gum composition, depending upon the sweetener used. The exact range of amounts for each type of sweetener is well known in the art and is not the subject of the present invention.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing,* publication 1274, pages 63–258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, by weight of the gum composition. Preferably, the flavoring agent is present in amounts from about 0.1% to about 2%, and more preferably, the flavoring agent is present in amounts from about 0.8% to about 1.8%, by weight of the gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl -N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

The present invention extends to methods of making the improved sugarless, substantially anhydrous chewing gum compositions. The improved chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a composition is made by admixing the inventive sugarless, substantially anhydrous chewing gum composition with the other ingredients of the final desired composition. Other ingredients will usually be incorporated into the composition as dictated by the nature of the desired composition as well known by those having ordinary skill in the art. The ultimate chewing gum compositions are readily prepared using methods generally known in the food technology and pharmaceutical arts.

For example, a gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the base such as the plasticizer, the softener, the bulking agent, the sweetener, and/or fillers, coloring agents and flavoring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

An important aspect of the present invention includes a confectionery coated chewing gum composition incorporating the inventive sugarless, substantially anhydrous chewing gum composition and a method for preparing the confectionery coated chewing gum compositions. Such confectionery coated compositions contain the inventive sugarless, substantially anhydrous chewing gum composition as the center or core portion of the chewing gum product and a confectionery material as a coating over the center portion. The confectionery material may be either a sugar material or a sugarless material, and preferably is a sugarless confectionery material.

The improved confectionery coated chewing gum compositions may be prepared using standard techniques and equipment known to those skilled in the art.

The apparatus useful in accordance with the present invention comprises mixing, heating, coating (dusting) and drying apparatus well known in the chewing gum manufacturing arts, and therefore the selection of the specific apparatus will be apparent to the artisan.

In such a method, a composition is made by admixing the inventive sugarless, substantially anhydrous chewing gum composition as set out above with the other ingredients of the desired core portion composition. The homogeneous mixture is then formed into pieces which are then placed in a revolving coating pan. A confectionery coating syrup is prepared, with heating if necessary, and then applied to the gum pieces. The coated gum pieces are then allowed to cool and dry. Various ingredients will usually be incorporated into the confectionery coating composition as dictated by the nature of the desired composition as well known by those having ordinary skill in the art. The ultimate coated chewing gum compositions are readily prepared using methods generally known in the art of chewing gum technology such as, for example in United States patents no. 4,238,510 and 4,317,838, issued to Cherukuri et al., which disclosures are incorporated herein by reference.

The present invention is further illustrated by the following examples which are not intended to limit the effective scope of the claims. All parts and percentages in the examples and throughout the specification and claims are by weight of the final composition unless otherwise specified.

EXAMPLE 1

Noninventive Run 1

This example demonstrates the preparation of a conventional sugarless chewing gum composition having the following composition:

| Ingredient | Example 1 Percentage by Weight |
| --- | --- |
| gum base | 23.00 |
| sorbitol | 51.00 |
| mannitol | 7.07 |
| sweetening agent | 0.14 |
| softening agent | 16.86 |
| flavoring agent | 1.75 |
| coloring agent | 0.18 |

EXAMPLES 2-4

Inventive Runs 2-4

These examples demonstrate the preparation of sugarless, substantially anhydrous chewing gum compositions according to the present invention having the following compositions:

| | Percentage by Weight | | |
| --- | --- | --- | --- |
| Ingredient | Example 2 | Example 3 | Example 4 |
| gum base | 23.00 | 23.00 | 23.20 |
| PALATINIT | 25.50 | 51.00 | 58.20 |
| sorbitol | 25.50 | — | — |
| mannitol | 7.07 | 7.07 | — |
| sweetening agent | 0.14 | 0.14 | — |
| softening agent | 16.86 | 16.86 | 16.65 |
| flavoring agent | 1.73 | 1.73 | 1.50 |
| coloring agent | 0.18 | 0.18 | 0.10 |

The degree of relative hardness of the chewing gum compositions of examples 1-4 was measured over a period of five weeks at a temperature of 23° C. (74° F.) and a relative humidity of 23%. Hardness was measured with an Instron Model 1130 durometer having a digital readout from Valtes Associates Inc. A 3/16 inch plunger was pressed against the surface of the gum until the surface was penetrated. The measurements, in pounds versus weeks of storage, are set out in FIG. 1.

FIG. 1 shows that the chewing gum compositions which contained PALATINIT as the bulking agent (examples 2-4) were firmer than the chewing gum which contained sorbitol and mannitol as the bulking agent (example 1). FIG. 1 also shows that the chewing gum composition which contained a mixture of PALATINIT and sorbitol and mannitol as the bulking agent (example 2) was firmer than the chewing gum composition which contained only sorbitol and mannitol as the bulking agents (example 1). The chewing gum composition of example 4 which contained only PALATINIT as the bulking agent was significantly firmer, after a period of five weeks, than the chewing gum composition of example 1, which contained sorbitol and mannitol as the bulking agent, and the chewing gum composition of example 2, which contained a mixture of PALATINIT and sorbitol and mannitol as the bulking agent (example 2).

The amount of moisture absorbed by the chewing gum compositions of examples 1-4 was also measured over a period of five weeks at a temperature of 27° C. (80° F.) and a relative humidity of 80%. The measurements, in percentage moisture absorbed versus weeks of storage, are set out in FIG. 2.

Figure 2:
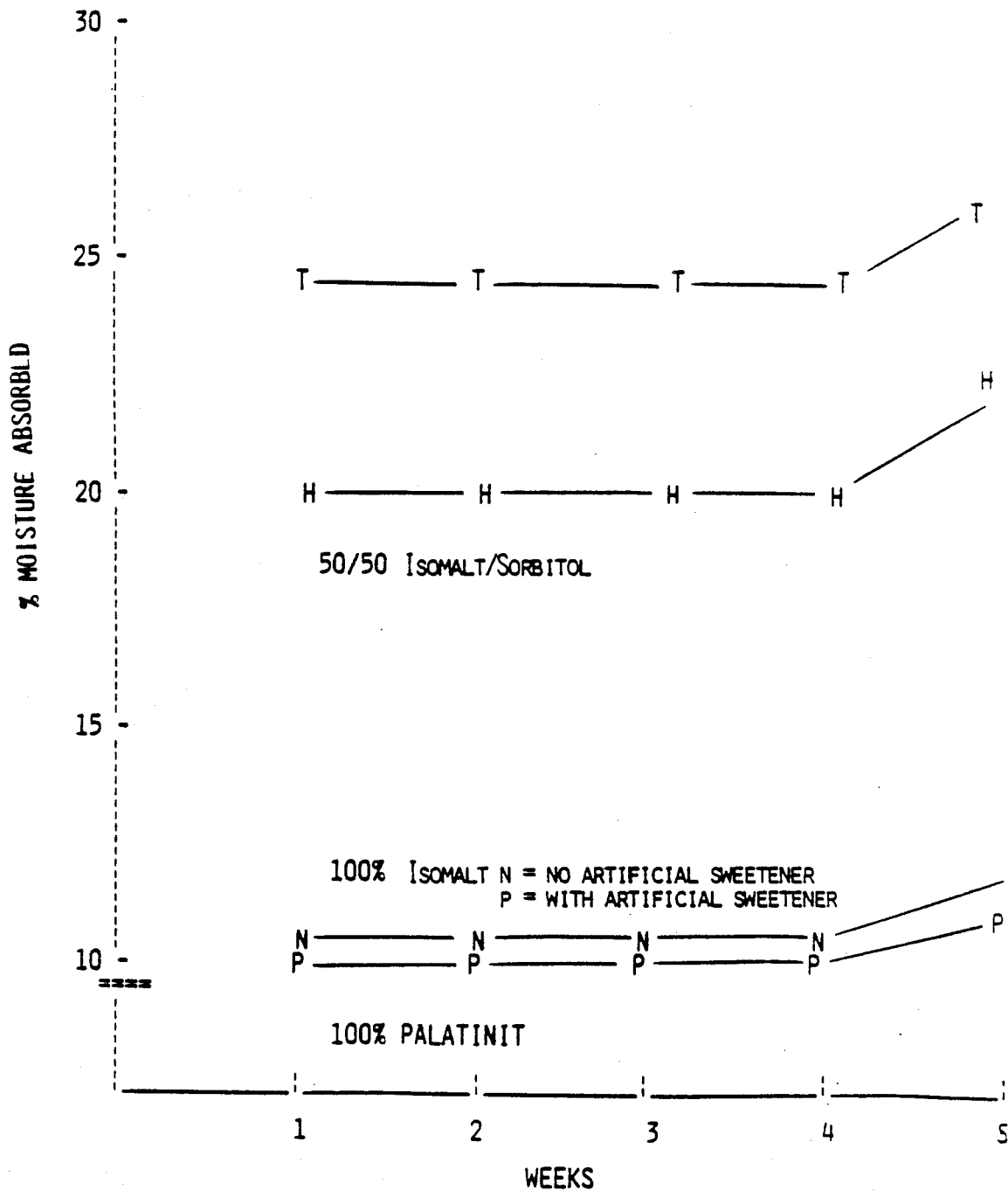
FIG. 2 depicts in graph format the amount of moisture absorbed versus storage time at 27° C. and 80% relative humidity of several chewing gum compositions containing various combinations of sugar alcohols and PALATINIT as the bulking agent (Examples 1-4).

FIG. 2 shows that the chewing gum compositions which contained PALATINIT as the bulking agent (examples 2-4) absorbed less moisture than the chewing gum compositions which contained sorbitol and mannitol as the bulking agent (example 1). FIG. 2 also shows that the chewing gum composition which contained a mixture of PALATINIT and sorbitol and mannitol as the bulking agent (example 2) absorbed less moisture than the chewing gum composition which contained only sorbitol and mannitol as the bulking agent (example 1). The chewing gum composition of example 4 which contained only PALATINIT as the bulking agent absorbed significantly less moisture, after a period of five weeks, than the chewing gum composition of example 1, which contained only sorbitol and mannitol as the bulking agent and the chewing gum composition of example 2, which contained a mixture of PALATINIT and sorbitol and mannitol as the bulking agent (example 2). The chewing gum composition of example 4 absorbed only 11.17% moisture over a period of five weeks which is a significant improvement over the chewing gum composition of example 1 (control) which absorbed 26.6% moisture over the same period.

The moisture level and degree of firmness of the chewing gum compositions of the present invention remained relatively constant during storage.

EXAMPLES 5-7

Noninventive Run 5

Inventive Runs 6-7

These examples demonstrate the preparation of sugarless, substantially anhydrous chewing gum center compositions for confectionery sugarless coatings according to the present invention having the following compositions:

| Ingredient | Percentage by Weight | | |
|---|---|---|---|
| | Example 5 | Example 6 | Example 7 |
| gum base | 23.02 | 23.02 | 23.02 |
| PALATINIT | — | 29.84 | 59.68 |
| sorbitol | 53.40 | 29.84 | — |
| mannitol | 6.28 | — | — |
| sweetening agent | 0.14 | 0.14 | 0.14 |
| softening agent | 15.15 | 15.15 | 15.15 |
| flavoring agent | 2.01 | 2.01 | 2.01 |

The degree of relative hardness of the chewing gum compositions of examples 5-7 was measured under the conditions and according to the procedure set out above. measurements, in pounds versus weeks of storage, are set out in Table 1 below.

TABLE 1

| Example | Durometer | | | Instron (pounds) | | |
|---|---|---|---|---|---|---|
| | Day 0 | Day 1 | Day 2 | Day 0 | Day 1 | Day 2 |
| 5 | 9.65 | 11.70 | 12.54 | 4.05 | 5.49 | 5.46 |
| 6 | 18.55 | 18.90 | 20.30 | 5.58 | 9.51 | 9.66 |
| 7 | 31.70 | 34.55 | 34.85 | 9.04 | 13.58 | 13.05 |

Table 1 shows that the chewing gum compositions which contained PALATINIT as the bulking agent (examples 6-7) were firmer than the chewing gum composition which contained sorbitol and mannitol as the bulking agents (example 5). Table 1 also shows that the chewing gum composition which contained PALATINIT as the sole bulking agent (example 7) was firmer than the chewing gum composition which contained PALATINIT and sorbitol and mannitol as the bulking agent (example 6).

The chewing gum compositions of examples 5-7 were coated by a conventional sugarless coating process, such as that disclosed in Cherukuri et al., U.S. Pat. No. 4,317,838 and 4,238,510. The confectionery coated chewing gums were then evaluated by an expert panel on a scale from 10, where a score of 8-10 was rated excellent and a score of 5-7 was rated good. The results are set forth in Table 2 below.

TABLE 2

| Example | Crispness/Crunch Texture Test |
|---|---|
| 5 | 5 |
| 6 | 8 |
| 7 | 8 |

Table 2 shows that the chewing gum compositions which contained PALATINIT as the bulking agent (examples 6 and 7) compared favorably in the "crispness" or "crunch" test with the chewing gum composition which contained sorbitol and mannitol as the bulking agent (example 5).

The chewing gum compositions of the present invention were firmer and easier to coat with a confectionery material. The confectionery coated chewing gum compositions of the present invention were firmer in texture yet had an acceptable soft chew texture.

EXAMPLE 8

Inventive Run 8

This example demonstrates the preparation of a sugarless, substantially anhydrous chewing gum composition according to the present invention having a high percentage of gum base and the following composition:

| Ingredient | Example 8 Percentage by Weight |
|---|---|
| gum base | 65.0 |
| PALATINIT | 27.0 |
| sweetening agent | 0.5 |
| softening agent | 5.5 |
| flavoring agent | 2.0 |

The chewing gum composition of this example, like the examples set out above, was also firm, exhibited low moisture absorption and was easy to coat with a confectionery material.

The invention being thus described, it will be obvious that the same may be varied in many ways. Such variations are not to be regarded as a departure from the spirit and scope of the invention and all such modifications are intended to be included within the scope of the following claims.

We claim:

1. A sugarless, substantially anhydrous chewing gum composition which comprises:
   (a) a gum base;
   (b) a low-moisture pick-up, non-hygroscopic bulking agent comprising a racemic mixture of alpha-D-glucopyranosyl-1,6-mannitol and alpha-D-glucopyranosyl-1,6-sorbitol in an amount from about 10% to about 70% by weight;
   (c) a softening agent; and
   (d) a sweetening agent;
   (e) wherein the chewing gum composition contains no more than about 2.5% water, by weight of the total chewing gum composition; and
   (f) wherein said non-hygroscopic bulking agent provides to the gum composition a firm texture and reduced moisture absorption, and maintains the gum composition in its substantially anhydrous state.

2. The composition according to claim 1, wherein the gum base is present in an amount from about 10% to about 75%, by weight of the chewing gum composition.

3. The composition according to claim 2, wherein the gum base is present in an amount from about 15% to about 40%, by weight of the chewing gum composition.

4. The composition according to claim 1, wherein the non-hygroscopic bulking agent is present in an amount from about 25% to about 65%, by weight of the chewing gum composition.

5. The composition according to claim 1, wherein the softening agent is present in an amount up to about 18%, by weight of the chewing gum composition.

6. The composition according to claim 5, wherein the softening agent is present in an amount from about 5% to about 18%, by weight of the chewing gum composition.

7. The composition according to claim 1, wherein the sweetening agent is present in an amount from about 0.001% to about 3%, by weight of the chewing gum composition.

8. The composition according to claim 7, wherein the sweetening agent is present in an amount from about 0.01% to about 1%, by weight of the chewing gum composition.

9. The composition according to claim 1, wherein the softening agent is glycerin.

10. The composition according to claim 1, wherein the non-hygroscopic bulking agent further comprises a sugar alcohol.

11. The composition according to claim 10, where the sugar alcohol is sorbitol.

12. The composition according to claim 10, wherein the sugar alcohol is present in an amount up to about 67%, by weight of the total bulking agent.

13. The composition according to claim 12, wherein the sugar alcohol is present in an amount up to about 50%, by weight of the total bulking agent.

14. A confectionery coated chewing gum composition comprising:
(1) a center portion comprising a sugarless, substantially anhydrous chewing gum composition which comprises:
   (a) a gum base;
   (b) a low-moisture pick-up, non-hygroscopic bulking agent comprising a racemic mixture of alpha-D-glycopyranosyl-1,6-mannitol and alpha-D-glucopyranosyl-1,6-sorbitol in an amount from about 10% to about 70% by weight;
   (c) a softening agent; and
   (d) a sweetening agent;
   (e) wherein the chewing gum composition contains no more than about 2.5% water, by weight of the total chewing gum composition; and
   (f) wherein said non-hygroscopic bulking agent provides to the gum composition a firm texture and reduced moisture absorption, and maintains the gum composition in its substantially anhydrous state; and
(2) a confectionery coating over the center portion of the chewing gum composition of step (1).

15. The composition according to claim 14, wherein the gum base is present in an amount from about 10% to about 75%, by weight of the chewing gum composition.

16. The composition according to claim 15, wherein the gum base is present in an amount from about 15% to about 40%, by weight of the chewing gum composition.

17. The composition according to claim 14, wherein the non-hygroscopic bulking agent is present in an amount from about 25% to about 65%, by weight of the chewing gum composition.

18. The composition according to claim 14 wherein the softening agent is present in an amount up to about 18%, by weight of the chewing gum composition.

19. The composition according to claim 18, wherein the softening agent is present in an amount from about 5% to about 18%, by weight of the chewing gum composition.

20. The composition according to claim 14, wherein the sweetening agent is present in an amount from about 0.001% to about 3%, by weight of the chewing gum composition.

21. The composition according to claim 20, the sweetening agent is present in an amount from about 0.01% to about 1%, by weight of the chewing gum composition.

22. The composition according to claim 14, wherein the softening agent is glycerin.

23. The composition according to claim 15, wherein the non-hygroscopic bulking agent further comprises a sugar alcohol.

24. The composition according to claim 23, wherein the sugar alcohol is sorbitol.

25. The composition according to claim 23, wherein the sugar alcohol is present in an amount up to about 67%, by weight of the total bulking agent.

26. The composition according to claim 25, wherein the sugar alcohol is present in an amount up to about 50%, by weight of the total bulking agent.

27. The composition according to claim 14, wherein the confectionery coating comprises a sugarless coating.

28. A method for preparing a sugarless, substantially anhydrous chewing gum composition which comprises the steps of:
(A) providing the following ingredients:
   (a) a gum base;
   (b) a low-moisture pick-up, non-hygroscopic bulking agent comprising a racemic mixture of alpha-D-glucopranosyl-1,6mannitol and alpha-D-glucopyranosyl-1,6-sorbitol in an amount from about 10% to about 70% by weight;
   (c) a softening agent; and
   (d) a sweetening agent;
   (e) wherein the chewing gum composition contains no more than about 2.5% water, by weight of the total chewing gum composition; and
   (f) wherein said non-hygroscopic bulking agent provides to the gum composition a firm texture and reduced moisture absorption, and maintains the gum composition in its substantially anhydrous state;
(B) mixing the softening agent and the bulking agent at a temperature of about 50° C.;
(C) admixing the gum base to the mixture of step (B) to form a uniform mixture;
(D) allowing the uniform mixture to cool; and
(E) forming the mixture into a chewing gum product.

29. The method according to claim 28, wherein the gum base is present in an amount from about 10% to about 75%, by weight of the chewing gum composition.

30. The method according to claim 28, wherein the softening agent is present in an amount up to about 18%, by weight of the chewing gum composition.

31. The method according to claim 28, wherein the sweetening agent is present in an amount from about 0.001% to about 3%, by weight of the chewing gum composition.

32. The method according to claim 28, wherein the softening agent is glycerin.

33. The method according to claim 28, wherein the non-hygroscopic bulking agent further comprises a sugar alcohol.

34. The method according to claim 33, wherein the sugar alcohol is sorbitol.

35. The method according to claim 33, wherein the sugar alcohol is present in an amount up to about 67%, by weight of the total bulking agent.

36. A method for preparing a confectionery coated sugarless, substantially anhydrous chewing gum composition which comprises the steps of:
(A) providing the following ingredients:
   (a) a gum base;
   (b) a low-moisture pick-up, non-hygroscopic bulking agent comprising a racemic mixture of alpha-D-glucopyranosyl-1,6-mannitol and alpha-D-glucopyranosyl-1,6-sorbitol in an amount from about10% to about 70% by weight;
   (c) a softening agent; and
   (d) a sweetening agent;

(e) wherein the chewing gum composition contains no more than about 2.5 water, by weight of the total chewing gum composition; and (f) wherein said non-hygroscopic bulking agent provides to the gum composition a firm texture and reduced moisture absorption, and maintains the gum composition in its substantially anhydrous state; and (B) mixing the softening agent and the bulking agent at a temperature of about 50° C.;

(C) admixing the gum base to the mixture of step (B) to form a uniform mixture;

(D) allowing the uniform mixture to cool;

(E) forming the mixture into a chewing gum product; and (F) coating the mixture from step (E) with a confectionery coating material.

37. The method according to claim 36, wherein base is present in an amount from about 10% to about 75%, by weight of the chewing gum composition.

38. The method according to claim 36, wherein the softening agent is present in an amount up to about 18% by weight of the chewing gum composition.

39. The method according to claim 36, wherein the sweetening agent is present in an amount from about 0.001% to about 3%, by weight of the chewing gum composition.

40. The method according to claim 36, wherein the softening agent is glycerin.

41. The method according to claim 36, wherein the non-hygroscopic bulking agent further comprises a sugar alcohol.

42. The method according to claim 41, wherein the sugar alcohol is sorbitol.

43. The method according to claim 41, wherein the sugar alcohol is present in an amount up to about 67%, by weight of the total bulking agent.

* * * * *